May 24, 1960

J. H. GRISSINGER 2,937,873

HUNTING HEAD FOR AN ARROW OR THE LIKE

Filed Jan. 22, 1959

INVENTOR

JOHN H. GRISSINGER

BY Scrivener & Parker

ATTORNEYS

United States Patent Office 2,937,873
Patented May 24, 1960

2,937,873

HUNTING HEAD FOR AN ARROW OR THE LIKE

John H. Grissinger, Elyria, Ohio, assignor to Mohawk Sporting Equipment Co., Elyria, Ohio, a corporation of Ohio Filed Jan. 22, 1959, Ser. No. 788,308

4 Claims. (Cl. 273—106.5)

This invention relates to hunting equipment and more particularly to a hunting head or point for an arrow, harpoon or gig for killing or capturing animals, particularly fish.

An object of the present invention is the provision of a barbed head or point for an arrow, harpoon or gig which is particularly, though not exclusively, adapted to the killing or catching of fish.

More particularly it is an object of the invention to provide a barbed head for an arrow or the like wherein the barb may be moved from a locked rearwardly extended position to a forward position to facilitate the ready withdrawal of the head from an animal.

Another object of the invention is to provide a barbed head for a hunting arrow or the like having improved locking means for retaining the barb in hunting position with the locking means being so arranged as to offer substantially no interference to the arrow's penetration into an animal.

Other objects and their attendant advantages will become apparent as the following detailed description is read in conjunction with the accompanying drawings wherein.

Figure 1:
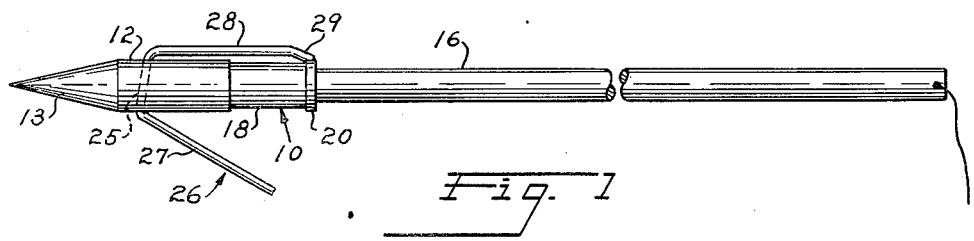
Fig. 1 is an elevational view of an arrow equipped with a barbed head or point constructed in accordance with the invention and showing the barb in its locked rearward position.

Referring to the drawing, 10 designates the head of the hunting or fishing arrow which comprises an elongated cylindrical body portion 12 tapered at its forward end to a point 13 and provided at its opposite end with a socket 14 to receive the end of a shaft 16. The rear part of the body portion 12 is reduced slightly in diameter to provide a shallow elongated groove 18 whose rear end is defined by an integral collar 20 surrounding the open end of the socket 14.

Figure 3:
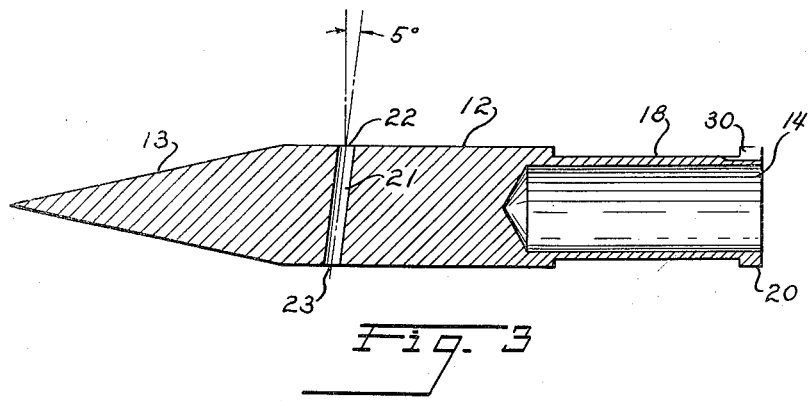
Fig. 3 is an enlarged cross-sectional view of the head with the barb removed.

Just rearwardly of the tapered portion 13 there extends through the body portion 12 an aperture 21 whose axis lies in a plane through the longitudinal axis of the head but is tilted with respect to a line perpendicular to said axis so that one end 22 of the aperture is rearward of the other end 23 as clearly seen in Fig. 3. The aperture 21 is adapted to pivotally receive the loop or bight portion 25 of a U-shaped barb member 26 which is of spring wire-like material having a leg 27 which serves as a barb and a leg 28 which serves as a lock for releasably retaining the barb in its rearward or holding position when a down-turned end portion 29 of the leg 28 is engaged in a slot or recess 30 disposed in the collar 20 in alignment with the aperture end 22.

Figure 2:
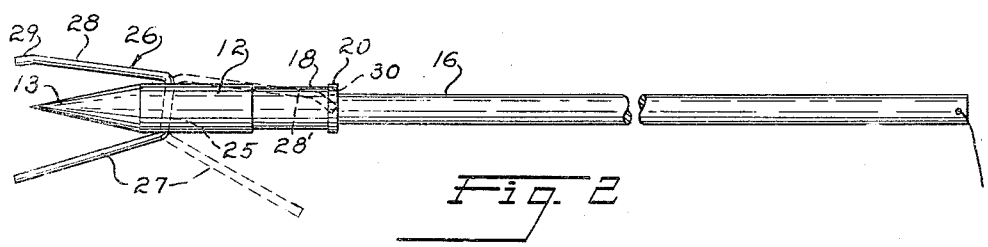
Fig. 2 is a view similar to Fig. 1 showing the barb moved to its unlocked forward position.

A particular feature of the invention resides in the novel arrangement for insuring that the portion 29 of leg 28 is retained in locking engagement with the slot 30. This is accomplished by means of the tilted aperture 21 and a pre-selected angular relationship between the loop portion 25 and the leg 28 with the arrangement being such that when the member 26 is swung from the forward position of Fig. 2 rearwardly, the leg 28 tends to form an inwardly and rearwardly directed angle with respect to the lengthwise axis of the head as indicated by the phantom lines 28'. For example, if the angle of tilt of the aperture 21 is 5° with respect to a line perpendicular to the axis of the head and the included angle between the leg 28 and the loop 25 is 90°, it will be apparent that the phantom lines 28' would form a downward angle of 5° with the lengthwise axis of the head. In order for the end portion 29 of leg 28 to be engaged in the slot 30, the leg 28 must be forcibly sprung upwardly and the member 26 pivoted until the end 29 registers with the slot 30 so that when the former is released it snaps into the slot and is at all times spring-urged into tight engagement with the recess.

In use, the barb 27 is locked in its rearward or holding position of Fig. 1 as above explained. When the head has been engaged in a fish or other animal and the latter retrieved, the head is pushed entirely through the animal until the barb is fully exposed whereupon the hunter merely springs the leg 28 free of the notch, pivots the member 26 to the position of Fig. 2, and withdraws the head. It will be observed that when member 26 is in the position of Fig. 2 the angular relationship between the barb leg 27 and the axis of the head is reduced from the holding angle of Fig. 1 an amount equal to the angular tilt of the aperture 21. Thus the barb while being withdrawn does not tear the animal's flesh to the same extent that it would if the angle were the same when the barb is in both its rearward and forward positions.

It should be understood that the head of the invention is susceptible of a variety of modifications and changes without, however, departing from the scope and spirit of the appended claims.

What is claimed is:

1. A hunting head for an arrow or the like comprising a cylindrical body member having at its forward end a tapered portion forming a point and at its rear end a socket for receiving the end of a shaft, an aperture through said body member adjacent the tapered portion, said aperture lying in a plane through the longitudinal axis of said head but being tilted with respect to a line perpendicular to said longitudinal axis so that one end of said aperture is displaced rearwardly of the other end, a recess at the rear of said body in alignment with the rearward end of said aperture, a resilient U-shaped barb member having its loop portion pivotally received in said aperture and having one leg extending from the forwardly disposed end of said loop portion angularly outwardly and rearwardly away from the axis of said head to form a barb, a second leg extending rearwardly from the rearwardly disposed end of said loop portion and being biased inwardly towards the axis of said head, said second leg having an end part engaged in said recess to releasably lock the legs of said member in a rearward position, said second leg being springable outwardly to disengage said end part from said recess to permit a swinging of the legs of said member to a forwardly directed position.

2. A hunting head for an arrow or the like comprising a cylindrical body member having at its forward end a tapered portion forming a point and at its rear end a socket for receiving the end of a shaft, an aperture through said body member adjacent the tapered portion, said aperture lying in a plane through the longitudinal axis of said head but being tilted with respect to a line perpendicular to said longitudinal axis so that one end of said aperture is displaced rearwardly from the other end, a recess at the rear of said body in alignment with the rearward end of said aperture, a resilient U-shaped barb member having its loop pivotally received in said aperture and having one leg extending angularly outwardly and rearwardly from the forward end of said aperture to form a barb and having a second leg extending rearwardly from the rear end of said aperture and being biased inwardly toward the axis of said head, said second leg being engaged in said recess to releasably lock the legs of said member in a rearward position, said second leg being springable from said recess to permit a swinging of the leg of said member to a forwardly directed position.

3. A hunting head for an arrow or the like comprising a substantially cylindrical body member having at its forward end a tapered portion forming a point and at its rear end a socket for receiving the end of a shaft, an aperture through said body member adjacent the tapered portion, a recess adjacent the rear of said body member in alignment with an end of said aperture, a resilient U-shaped barb member having its loop portion pivotally received in said aperture and one leg extending from an end of said loop portion angularly outwardly and rearwardly away from the axis of said head to form a barb, a substantially straight second leg extending rearwardly from the opposite end of said loop portion and being biased inwardly towards the axis of said head, said second leg having an end part engaged in said recess to releasably lock the legs of said member in a rearward position, said second leg being springable from said recess to permit a swinging of the legs of said member to a forwardly directed position.

4. A hunting head for an arrow or the like comprising a substantially cylindrical elongated body member having at its forward end a tapered portion forming a point and at its rear end a socket for receiving the end of a shaft, an aperture through said body member adjacent to but rearwardly of the tapered portion, said aperture lying in a plane through the longitudinal axis of said head, a recess in said body member rearwardly of said aperture and in alignment with an end thereof, a resilient U-shaped barb member having its loop portion pivotally received in said aperture and one leg extending from an end of said loop portion angularly outwardly and rearwardly away from the axis of said head to form a barb, a straight second leg extending from the opposite end of said loop portion rearwardly of said body, said second leg having an end part extending angularly inwardly with respect to the axes of said leg and said body and engaged in said recess, said second leg being springable outwardly away from the axis of said body so as to disengage said end part from said recess to permit a swinging of the legs of said member to a forwardly directed position.

References Cited in the file of this patent
UNITED STATES PATENTS
2,753,643   Recker _____ July 10, 1956

OTHER REFERENCES
"Archery" magazine for February 1957; page 27.